United States Patent
Ham et al.

(10) Patent No.: US 9,748,562 B2
(45) Date of Patent: Aug. 29, 2017

(54) NEGATIVE ACTIVE MATERIAL, NEGATIVE ELECTRODE INCLUDING THE NEGATIVE ACTIVE MATERIAL, AND LITHIUM SECONDARY BATTERY INCLUDING THE NEGATIVE ELECTRODE

(71) Applicant: Samsung Electronics Co., Ltd., Suwon-si, Gyeonggi-do (KR)

(72) Inventors: Dong-jin Ham, Anyang-si (KR); Jeong-kuk Shon, Hwaseong-si (KR); Min-sang Song, Seongnam-si (KR); Seung-sik Hwang, Seongnam-si (KR); Jun-hwan Ku, Seoul (KR); Jae-jun Chang, Seoul (KR); Sang-min Ji, Suwon-si (KR); Jae-man Choi, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 183 days.

(21) Appl. No.: 14/247,541

(22) Filed: Apr. 8, 2014

(65) Prior Publication Data
US 2015/0111102 A1    Apr. 23, 2015

(30) Foreign Application Priority Data
Oct. 18, 2013    (KR) .......................... 10-2013-0124930

(51) Int. Cl.
*H01M 4/133*    (2010.01)
*H01M 4/134*    (2010.01)
(Continued)

(52) U.S. Cl.
CPC .......... *H01M 4/366* (2013.01); *H01M 4/133* (2013.01); *H01M 4/134* (2013.01);
(Continued)

(58) Field of Classification Search
CPC .... H01M 4/366; H01M 4/386; H01M 10/052; H01M 4/663
(Continued)

(56) References Cited

U.S. PATENT DOCUMENTS

| 6,589,696 B2 | 7/2003 | Matsubara et al. |
| 7,744,772 B2 | 6/2010 | Gambut-Garel et al. |

(Continued)

FOREIGN PATENT DOCUMENTS

| JP | 2012-182087 A | 9/2012 |
| JP | 2012-201588 A | 10/2012 |

(Continued)

OTHER PUBLICATIONS

Datta et al., "Silicon, graphite and resin based hard carbon nanocomposite anodes for lithium ion batteries", Journal of Power Sources, 165, 2007, pp. 368-378.
(Continued)

*Primary Examiner* — James Lee
(74) *Attorney, Agent, or Firm* — Cantor Colburn LLP (57) ABSTRACT

A negative active material including graphite; silicon nanowires; and silicon nanoparticles, wherein a silicon nanowire of the silicon nanowires and a silicon nanoparticle of the silicon nanoparticles are each disposed on a particle of the graphite to form a composite with the graphite.

9 Claims, 6 Drawing Sheets

(51) Int. Cl.
| | |
|---|---|
| *H01M 4/587* | (2010.01) |
| *H01M 4/36* | (2006.01) |
| *H01M 4/38* | (2006.01) |
| *H01M 10/052* | (2010.01) |
| *H01M 4/1393* | (2010.01) |
| *H01M 4/1395* | (2010.01) |

(52) U.S. Cl.
CPC ....... *H01M 4/1393* (2013.01); *H01M 4/1395* (2013.01); *H01M 4/386* (2013.01); *H01M 4/587* (2013.01); *H01M 10/052* (2013.01)

(58) Field of Classification Search
USPC ...................................... 429/121–347, 218.1
See application file for complete search history.

(56) References Cited

U.S. PATENT DOCUMENTS

| | | | |
|---|---|---|---|
| 7,759,008 | B2 | 7/2010 | Barker et al. |
| 2008/0187838 | A1 | 8/2008 | Le |
| 2008/0261116 | A1 | 10/2008 | Burton et al. |
| 2010/0248001 | A1 | 9/2010 | Kuze et al. |
| 2010/0285359 | A1* | 11/2010 | Hwang ................ H01M 4/133 429/219 |
| 2010/0297502 | A1 | 11/2010 | Zhu et al. |
| 2010/0323232 | A1 | 12/2010 | Kuze et al. |
| 2011/0003191 | A1 | 1/2011 | Kuze et al. |
| 2011/0003192 | A1 | 1/2011 | Kuze et al. |
| 2011/0159345 | A1 | 6/2011 | Makidera et al. |
| 2012/0015230 | A1 | 1/2012 | Kuze et al. |
| 2012/0015236 | A1 | 1/2012 | Spare |
| 2012/0094178 | A1* | 4/2012 | Loveridge ............. H01M 4/134 429/217 |
| 2012/0189895 | A1 | 7/2012 | Gutsch et al. |
| 2014/0079979 | A1 | 3/2014 | Kwon et al. |
| 2014/0131630 | A1 | 5/2014 | Hwang et al. |
| 2015/0132655 | A1* | 5/2015 | Yuge .................... H01M 4/362 429/232 |

FOREIGN PATENT DOCUMENTS

| | | |
|---|---|---|
| KR | 1020070034254 A | 3/2007 |
| KR | 100818263 B1 | 3/2008 |
| KR | 1020120007508 A | 1/2012 |
| KR | 1020120090143 A | 8/2012 |
| KR | 1020130119207 A | 10/2013 |

OTHER PUBLICATIONS

Shen et al., "Si/mesoporous carbon composite as an anode material for lithium ion batteries", Journal of alloys and Compounds, 552, 2013, pp. 60-64.

Xu et al., "Composite Silicon Nanowire Anodes for Secondary Lithium-Ion Cells", Journal of The Electrochemical Society, 157(1), 2010, pp. A41-A45.

Yabuuchi et al., "P2-type $Na_x[Fe_{1/2}Mn_{1/2}]O_2$ made from earth-abundant elements for rechargeable Na batteries", Nature Materials, 11, Jun. 2012, pp. 512-517.

Yu et al., "Graphite microspheres decorated with Si particles derived from waste solid of organosilane industry as high capacity anodes for Li-ion batteries", Journal of Power Sources, 228, 2013, pp. 112-119.

Zhao et al., "Synthesis, characterization, and electrochemistry of cathode material Li $[Li_{0.2}Co_{0.13}Ni_{0.13}Mn_{0.54}]O_2$ using organic chelating agents for lithium-ion batteries", Journal of Power Sources, vol. 228, 2013 pp. 206-213.

Zhu et al., "Growth of silicon/carbon microrods on graphite microspheres as improved anodes for lithium-ion batteries", Electronic Supplementary Material (ESI) for Journal of Materials Chemistry A, 2013, pp. 1-6.

* cited by examiner

NEGATIVE ACTIVE MATERIAL, NEGATIVE ELECTRODE INCLUDING THE NEGATIVE ACTIVE MATERIAL, AND LITHIUM SECONDARY BATTERY INCLUDING THE NEGATIVE ELECTRODE

CROSS-REFERENCE TO RELATED APPLICATION

This application claims priority to and the benefit of Korean Patent Application No. 10-2013-0124930, filed on Oct. 18, 2013, in the Korean Intellectual Property Office, and all the benefits accruing therefrom under 35 U.S.C. §119, the content of which is incorporated herein in its entirety by reference.

BACKGROUND

1. Field

The present disclosure relates to a negative active material, a negative electrode including the negative active material, and a lithium secondary battery including the negative electrode.

2. Description of the Related Art

High capacity silicon-based negative electrode materials are receiving much attention as negative electrode materials for next generation lithium batteries because silicon can theoretically provide a specific capacity of 3,570 mAh/g at room temperature. However, such negative electrode materials undergo a volumetric expansion of about 280% at room temperature during lithium intercalation and deintercalation processes. Due to the volumetric expansion, silicon particles in the negative electrode materials are pulverized, and all charge and discharge characteristics (i.e., initial charge and discharge efficiencies, average charge and discharge efficiencies, lifespan characteristics, and high rate discharge characteristics) rapidly deteriorate, which causes delays in the commercialization of the negative electrode materials, despite their high theoretical capacities.

Accordingly, there remains a need for a negative active material having high capacity and which is capable of maintaining other charge and discharge characteristics (i.e., initial charge and discharge efficiencies, average charge and discharge efficiencies, lifespan characteristics, and high rate discharge characteristics) at a high level.

SUMMARY

According to an embodiment, provided is a negative active material including silicon nanowires and silicon nanoparticles.

According to other embodiments, provided is a negative electrode including the negative active material.

According to other embodiments, provided is a lithium secondary battery including the negative electrode.

Additional aspects will be set forth in part in the description which follows and, in part, will be apparent from the description.

According to an aspect, provided is a negative active material that includes graphite; silicon nanowires; and silicon nanoparticles, wherein a silicon nanowire of the silicon nanowires and a silicon nanoparticle the silicon nanoparticles are each disposed on a particle of the graphite to form a composite with the graphite.

An aspect ratio of the silicon nanowires may exceed 1.1, and an aspect ratio of the silicon nanoparticles may be 1.1 or less.

The negative active material may include about 0.1 weight percent (wt %) to about 50 wt % of the silicon nanowires, and about 0.001 wt % to about 37.5 wt % of the silicon nanoparticles.

An amount of the silicon nanoparticles may be about 1 part by weight to about 75 parts by weight, based on 100 parts by weight of the silicon nanowires.

The silicon nanoparticles may be disposed in a space between a particle of the graphite and a silicon nanowire of the silicon nanowires.

An amount of the graphite may be about 12.5 wt % to about 99.899 wt %, based on a total weight of the negative active material.

According to an aspect, provided is a negative electrode including the negative active material.

According to an aspect, provided is a lithium secondary battery including the negative electrode.

Also disclosed is a negative active material including a composite, the composite including: about 12.5 weight percent to about 99.899 weight percent graphite; about 0.1 weight percent to about 10 weight percent of silicon nanowires, wherein an aspect ratio of the silicon nanowires is 1.11 to about 3,000; and about 0.1 weight percent to about 10 weight percent of silicon nanoparticles, wherein an aspect ratio of the silicon nanoparticles is 0.91 to 1.1.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

To overcome the shortcomings of available silicon electrode materials, research is being conducted in to the effect of shapes and structures of silicon to develop materials that exhibit improved capacity and charge and discharge characteristics. For example, a negative electrode material for a lithium battery including graphite supported silicon nanowires comprising 92 weight percent (wt %) of graphite and 8 wt % of silicon nanowires (a product of Nanosys, Inc. of Palo Alto, Calif.) includes silicon nanowires having a one dimensional shape to prevent the reduction of charge and discharge characteristics caused by volumetric expansion and contraction of silicon that occurs during incorporation and deincorporation, e.g., intercalation and deintercalation, of lithium. This material has excellent charge and discharge characteristics. Accordingly, the negative electrode material is used in various fields.

However, to increase the capacity of the silicon negative electrode materials in an environment that desire higher capacity, an amount of silicon should be increased. However, in the graphite supported silicon nanowires, including an increased amount of silicon, although the capacity thereof may be increased, other charge and discharge characteristics (i.e., initial charge and discharge efficiencies, average charge and discharge efficiencies, lifespan characteristics, and high rate discharge characteristics) thereof may be decreased. Thus, simply increasing an amount of silicon to increase the capacity causes other problems. Also, specialized equipment, such as a chemical vapor deposition (CVD) apparatus, is used to provide the silicon nanowires, and thus increasing a ratio of the silicon nanowires in the negative electrode materials would be expensive and energetically inefficient.

Hereinafter, a negative active material, a negative electrode, and a lithium secondary battery according to an embodiment are disclosed in further detail.

A negative active material according to an embodiment includes a first graphite, silicon nanowires, and silicon nanoparticles, wherein a silicon nanowire of the silicon nanowires and a silicon nanoparticle of the silicon nanoparticles are each disposed on a particle of the first graphite to form a composite with the first graphite.

As used herein, "disposed on" may be used interchangeably with "supported on" or "bound to," and means to contact another material.

As used herein, "composite" refers to a material formed by combining two or more materials having different physical and/or chemical properties, wherein the composite has properties different from each material constituting the composite, and wherein particles or wires of each material are at least microscopically separated and distinguishable from each other in a finished structure of the composite.

The first graphite physically supports the silicon nanowires and the silicon nanoparticles to prevent or inhibit degradation of the negative active material, such as that caused by repeated expansion and contraction of the negative active material due to repeated intercalation of lithium ions into the negative active material and deintercalation of lithium ions out of the negative active material.

The first graphite may act as an active material and as a conductor.

The first graphite may comprise natural graphite and/or artificial graphite, and may comprise flake graphite, mesophase carbon microbeads, or a combination thereof. The artificial graphite may include artificial graphite obtained by heating soft carbon at a temperature of about 2500° C. or higher. The first graphite may have any suitable shape, may be rectilinear, curvilinear, or a combination thereof, and may have a spherical shape, for example. The first graphite may have any suitable surface area, such as a specific surface area of about 0.1 square meters per gram (m²/g) to about 100 m²/g, an aspect ratio of about 0.01 to about 6, and/or a tap density of about 0.4 grams per cubic meter (g/cm³) to 2 g/cm³.

An amount of the first graphite may be about 12.5 weight percent (wt %) to about 99.899 wt %, specifically 15 weight percent (wt %) to about 99.9 wt %, more specifically 20 weight percent (wt %) to about 99 wt %, based on a total weight of the negative active material. When the amount of the first graphite is in the range above, the negative active material may have a suitable capacity, may maintain a desirable structural stability, and may provide suitable lifespan characteristics.

The negative active material includes both the silicon nanowires and the silicon nanoparticles, and thus, and while not wanting to be bound by theory, it may have a suitable capacity and may maintain a desirable structural stability and provide suitable lifespan characteristics. An aspect ratio of the silicon nanowires may exceed 1.1, for example, and may be about 1.11 to about 3,000, specifically about 1.5 to about 2,500, more specifically about 2 to about 2000.

An aspect ratio of the silicon nanoparticles may be 1.1 or less, for example, and may be about 0.91 to about 1.1, specifically about 0.92 to about 1.0, more specifically about 0.93 to about 0.98. The silicon nanoparticles may be rectilinear, curvilinear, or a combination thereof, and may have a spherical shape, for example.

The negative active material may include the silicon nanowires in an amount of about 0.1 wt % to about 50 wt %, specifically about 1 wt % to about 45 wt %, more specifically about 5 wt % to about 40 wt % and the silicon nanoparticles in an amount of about 0.001 wt % to about 37.5 wt %, specifically about 0.01 wt % to about 35 wt %, more specifically about 0.1 wt % to about 30 wt %, each based on a total weight of the negative active material. When the amounts of the silicon nanowires and the silicon nanoparticles are in the foregoing ranges, the negative active material may include a sufficient amount of silicon to have a desirable capacity while still maintaining the structural stability thereof to a sufficient degree so that the negative active material has satisfactory lifespan characteristics.

The amount of the silicon nanoparticles may be about 1 part by weight to about 75 parts by weight, specifically about 2 part by weight to about 70 parts by weight, more specifically about 4 part by weight to about 65 parts by weight, based on 100 parts by weight of the silicon nanowires. When the amount of the silicon nanoparticles is in the range above, the negative active material may have desirable capacity and maintain suitable structural stability to have satisfactory lifespan characteristics.

The negative active material includes a plurality of the silicon nanowires, and the silicon nanoparticles may be disposed in spaces between nanowires of the plurality of silicon nanowires.

The silicon nanoparticles may be disposed in a space between a particle of the first graphite and a nanowire of the silicon nanowires.

The negative active material may have an initial discharge capacity of at least 580 milliampere-hours per gram and a capacity retention of at least 89 percent.

In an embodiment, the negative active material comprises a composite, the composite comprising: about 12.5 weight percent to about 99.899 weight percent graphite; about 0.1 weight percent to about 10 weight percent of silicon nanowires, wherein an aspect ratio of the silicon nanowires is 1.11 to about 3,000; and about 0.1 weight percent to about 10 weight percent of silicon nanoparticles, wherein an aspect ratio of the silicon nanoparticles is about 0.91 to 1.1.

The negative active material may be manufactured by forming a slurry by mixing the first graphite, the silicon nanowires, the silicon nanoparticles, and suitable solvent to form the slurry, and then drying the slurry to remove the solvent. The mixing may be conducted by any suitable mixer, such as a vibrating ball mill, a rotating ball mill, a planetary ball mill, a roller mill, a disc mill, or a rotary paddle mixer. Drying may be conducted in one or multiple steps. The temperature of each step may be individually selected and can include a ramp, and may be about 30° C. to about 200° C., specifically about 40° C. to about 180° C., more specifically about 50° C. to about 160° C. Also, the drying may be conducted at any suitable pressure, such as about 0.0001 to 0.1 megaPascals (mPa), specifically about 0.001 to 0.08 mPa, more specifically about 0.005 to 0.06 mPa. The pressure of each drying step may be individually selected, and any suitable steps or a ramp can be used.

The negative electrode according to an embodiment includes the negative active material.

The negative electrode may further include an additional negative active material suitable for use in a lithium secondary battery, in addition to the negative active material.

As the additional negative active material, a carbonaceous material such as a second graphite capable of intercalating and deintercalating lithium ions; lithium metal; an alloy comprising lithium metal; a silicon oxide-based material, or a combination thereof may be used. The second graphite may be the same or different than the first graphite.

The negative electrode may additionally include a binder and/or a conductor other than that of the negative active material disclosed above.

The binder may facilitate adherence between components of the negative electrode, such as the negative active material and the conductor, and adherence of the negative electrode to a current collector. Examples of the binder include polyacrylic acid (PAA), polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene-butadiene-rubber, fluorinated rubber, a copolymer thereof, or a combination thereof.

The binder may include lithium ions.

The amount of the binder may be in a range of about 1 part by weight to about 10 parts by weight, for example, in a range of about 2 parts by weight to about 7 parts by weight, based on a total weight of the negative active material. When the amount of the binder is in the range above, e.g., about 1 part by weight to about 10 parts by weight, the adherence of the negative electrode to the current collector may be suitably strong.

The conductor is not particularly limited as long as the conductor has conductivity and does not induce an undesirable chemical change in the lithium secondary battery including the conductor.

The conductor may include, for example, carbon black, carbon fiber, and a third graphite, which may be the same as or different from the first and/or the second graphite, or a combination thereof. The carbon black may be, for example, acetylene black, Ketjen black, Super P carbon, channel black, furnace black, lamp black, thermal black, or a combination thereof. The third graphite may be a natural graphite or an artificial graphite. A combination comprising at least one of the foregoing may be used.

The negative electrode may additionally include an additional conductor other than the carbonaceous conductor described above.

The additional conductor may be an electrically conductive fiber, such as a metal fiber; a metal powder such as a fluorinated carbon powder, an aluminum powder, or a nickel powder; a conductive whisker such as a zinc oxide or a potassium titanate; or a polyphenylene derivative. A combination comprising at least one of the foregoing may be used.

The negative active material may incorporate and deincorporate lithium, and thus may act as an active material, and may also be a conductor, e.g., due to the first graphite, and thus the total amount of the conductor and the additional conductor, if present, may be less than the total amount of the conductor and additional conductor when a different negative material is used. The total amount of the conductor and the additional conductor, if present, may be in a range of about 0.5 parts by weight to about 10 parts by weight, for example, and may be in a range of about 0.01 parts by weight to about 5 parts by weight, each based on 100 parts by weight of the negative active material. When the total amount of the conductor and the other conductor is in the range described above, e.g., about 0.5 parts by weight to about 10 parts by weight, a negative electrode having excellent ion conductivity may be obtained.

The negative electrode may be, for example, manufactured by the method described below.

First, a negative active material, the binder, the solvent, and optionally the carbonaceous conductor and/or the additional conductor are combined to prepare a composition for forming a negative active material layer.

Thereafter, the composition for forming the negative active material layer is disposed, e.g., coated, on a negative current collector and then dried to prepare a negative electrode.

A thickness of the negative current collector is generally in a range of about 3 micrometers ($\mu$m) to about 500 $\mu$m. The negative current collector is not particularly limited as long as the current collector has sufficient conductivity and does not induce an undesirable chemical change in the lithium secondary battery including the negative current collector. For example, the negative current collector may comprise copper; stainless steel; aluminum; nickel; titanium; heat treated carbon; copper or stainless steel surface-treated with carbon, nickel, titanium or silver; or an aluminum-cadmium alloy. A combination comprising at least one of the foregoing may be used. Also, as in an embodiment comprising a positive current collector as is further described below, the surface of the negative current collector may be modulated, e.g., to comprise a minute concavity and convexity on the surface of the negative current collector to improve adherence of the negative active material to the negative current collector. The negative current collector may be used in any suitable form, such as a film, a sheet, a foil, a net, a porous body, a foaming body, a non-woven fabric, or a combination thereof.

The solvent may comprise N-methyl pyrrolidone (NMP), acetone, water, or a combination thereof as a solvent. An amount of the solvent may be in a range of about 1 part by weight to about 50 parts by weight, based on 100 parts by weight of the negative active material. When the amount of the solvent is in the range above, formation of the active material layer may be facilitated.

A lithium secondary battery according to an embodiment includes the negative electrode.

The lithium secondary battery has improved capacity characteristics as well as improved lifespan and improved high rate discharge characteristics. The term "high rate discharge characteristics" as used herein refers to a ratio of an actual discharged capacity of a 100% charged cell when the cell is discharged completely with a current discharging all of the cell capacity over a 2 hour period, e.g., a C/2 rate, with respect to an actual discharged capacity of the 100% charged cell when the cell is discharged completely with a current discharging all of the cell capacity over a 10 hour period, e.g., a C/10 rate.

Hereinafter, a method of preparing the lithium secondary battery according to an embodiment will be described in further detail.

First, a negative electrode is prepared by the method described above.

Hereinafter, a positive electrode is prepared using a method similar to the method of preparing the negative electrode. For example, a lithium transition metal oxide, a binder, a conductor, and a solvent can be combined to prepare a composition for forming a positive active material layer. Thereafter, the composition for forming the positive active material layer is coated on the positive current collector and then dried to prepare a positive electrode.

The types and the amounts of the binder, the conductor, and the solvent used to prepare the composition for forming the positive active material layer may be the same as those for preparing the composition for forming the negative active material layer.

The positive active material may comprise a lithium transition metal oxide, and may comprise $LiCoO_2$, $LiNiO_2$, $LiMnO_2$, $LiMn_2O_4$, $Li(Ni_aCo_bMn_c)O_2$ (wherein $0<a<1$, $0<b<1$, $0<c<1$, $a+b+c=1$), $LiNi_{1-Y}Co_YO_2$, $LiCo_{1-Y}Mn_YO_2$, $LiNi_{1-Y}Mn_YO_2$ (wherein $0 \leq Y<1$), $LiMn_{2-z}Ni_zO_4$, $LiMn_{2-z}Co_zO_4$ (wherein $0<Z<2$), $LiCoPO_4$, or $LiFePO_4$.

A thickness of the positive current collector may be in a range of about 3 $\mu$m to about 500 $\mu$m. The positive current collector is not particularly limited as long as the current collector has sufficient conductivity and does not induce an undesirable chemical change in the lithium secondary battery including the positive current collector. For example, the positive current collector may comprise stainless steel; aluminum; nickel; titanium; heat treated carbon; or aluminum or stainless steel surface-treated with carbon, nickel, titanium or silver, or a combination thereof. Also, a modulation comprising a minute concavity and convexity may be formed on the surface of the positive current collector to improve adherence of the positive active material to the positive current collector, and the positive current collector may be used in various forms such as a film, a sheet, a foil, a net, a porous body, a foaming body, or a non-woven fabric.

The lithium secondary battery can be manufactured by disposing a separator between the positive electrode and the negative electrode and supplying an organic liquid electrolyte thereto.

The lithium secondary battery may be manufactured by, for example, sequentially laminating the negative electrode, the separator, and the positive electrode; winding or folding the laminated structure, then enclosing the wound or folded structure in a cylindrical or rectangular battery case or a pouch; and then disposing, e.g., injecting, the organic liquid electrolyte into the battery case or the pouch to manufacture the lithium secondary battery.

The separator can be porous, and a diameter of a pore of the separator may be in a range of about 0.01 $\mu$m to about 10 $\mu$m, and a thickness of the separator may be in a range of about 5 $\mu$m to about 300 $\mu$m. In greater detail, the separator may be a woven or a non-woven fabric comprising an olefin-based polymer such as polypropylene or polyethylene; or a glass fiber.

The organic liquid electrolyte may be prepared by dissolving a lithium salt in an organic solvent.

The organic solvent may comprise propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolan, N, N-dimethylformamide, dimethylacetamide, dimethylsulfoxide, dioxane, 1,2-dimethoxyethane, sulfolane, dichloroethane, chlorobenzene, nitrobenzene, diethylene glycol, dimethylether, or a combination thereof.

The lithium salt may comprise $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ wherein x and y are natural numbers, LiCl, LiI, or a combination thereof.

In a lithium secondary battery according to another embodiment, an organic solid electrolyte and/or an inorganic solid electrolyte may be used, either or both optionally in combination with the organic liquid electrolyte. When the organic solid electrolyte and/or the inorganic solid electrolyte are used, the organic solid electrolyte and/or inorganic solid electrolyte may act as a separator in some cases, and thus, the separator may be omitted if desired.

As the organic solid electrolyte, for example, a polyethylene derivative, a polyethylene oxide derivative, a polypropylene oxide derivative, a phosphoric acid ester polymer, a polyester sulfide, polyvinyl alcohol, a polyvinylidene fluoride, or a combination thereof may be used.

As the inorganic solid electrolyte, for example, a lithium nitride, a lithium halogenide, or a lithium sulfate such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, or a combination thereof may be used.

An embodiment will now be described in greater detail with reference to the following examples. However, the following examples are for illustrative purposes only and are not intended to limit the scope of the disclosure.

EXAMPLES

Examples 1 and 2, Comparative Examples 1 and 2, and Reference Examples 1 to 4: Preparing a Negative Active Material, a Negative Electrode, and a Coin Half Cell Graphite supported silicon nanowires (8 wt % SiNW/Graphite) (SiNanode™, a product of Nanosys Inc, Palo Alto, Calif.), silicon nanoparticles (SiNP) (silicon nanopowder, a product of CN Vision Co. Ltd. of Seoul, Korea), a conductor (SFG 6) (SFG6, a product of TIMCAL of Westlake, Ohio), and a binder solution (4 volume % Li-PAA solution prepared by dissolving PAA (polyacrylic acid, a product of Sigma-Aldrich Inc. of St. Louis, Mo.) and Li ions in water) were mixed together at a ratio shown in Table 1 below to prepare a composition for forming a negative active material layer. Thereafter, the composition for forming a negative active material layer was coated on a copper film, which is a negative current collector, to have a thickness of 100 μm. The coated composition was dried first at a temperature of 80° C., dried a second time at a temperature of 120° C. in a vacuum, and then the dried product roll-pressed to manufacture a negative electrode.

Thereafter, the negative electrode was rolled into a cylinder having a diameter of 12 millimeters (mm) and lithium metal was used as a counter electrode to manufacture a 2032-type coin half cell. In this regard, the organic liquid electrolyte was a 1.1 molar (M) $LiPF_6$ and 0.2 M $LiBF_4$ solution in a mixture of ethylene carbonate, diethylene carbonate, and fluoroethylene carbonate at a weight ratio of 2:6:2.

TABLE 1

| | Amounts (parts by weight) | | | |
|---|---|---|---|---|
| | 8 wt % of SiNW/Graphite | SiNP | SFG 6 | 4 volume % Li-PAA solution |
| Example 1 | 68.95 | 1.05 | 18 | 12 |
| Example 2 | 67.9 | 2.1 | 18 | 12 |
| Comparative Example 1 | 70 | 0 | 18 | 12 |
| Comparative Example 2 | 88 | 0 | 0 | 12 |
| Reference Example 1 | 64.4 | 5.6 | 18 | 12 |
| Reference Example 2 | 63.35 | 6.65 | 18 | 12 |
| Reference Example 3 | 62.3 | 7.7 | 18 | 12 |
| Reference Example 4 | 58.8 | 11.2 | 18 | 12 |

In Table 1, SiNW refers to silicon nanowires, SiNP refers to silicon nanoparticles, and PAA is polyacrylic acid.

Evaluation Example

Evaluation Example 1: Analysis of an X-Ray Diffraction (XRD) Pattern of a Negative Electrode The negative electrodes prepared in Examples 1 and 2 and Comparative Example 1 were each analyzed by X-ray diffraction using a Philips X-Pert PRO diffractometer, and results obtained therefrom are shown in FIG. 1.

Figure 1A:
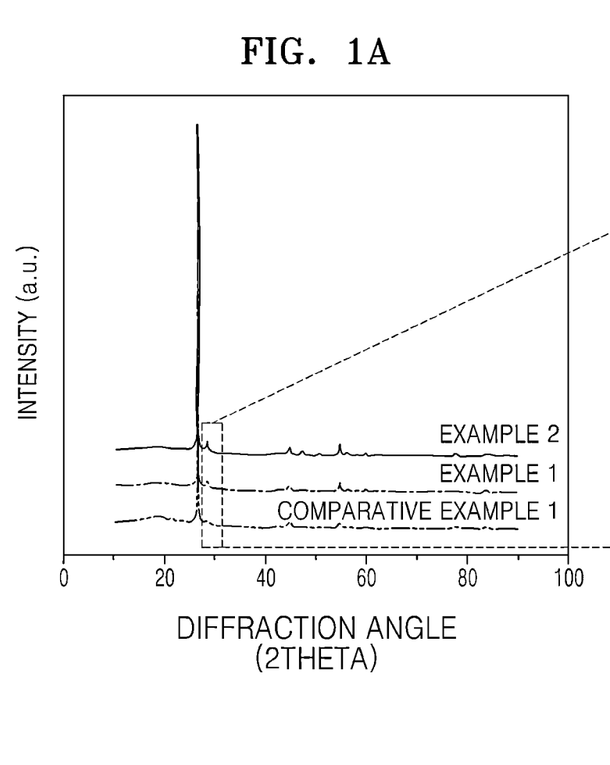
FIG. 1A is a graph of intensity (arbitrary units, a.u.) versus diffraction angle (degrees 2 theta) and is an X-ray diffraction pattern of a negative electrode.
Figure 1B:
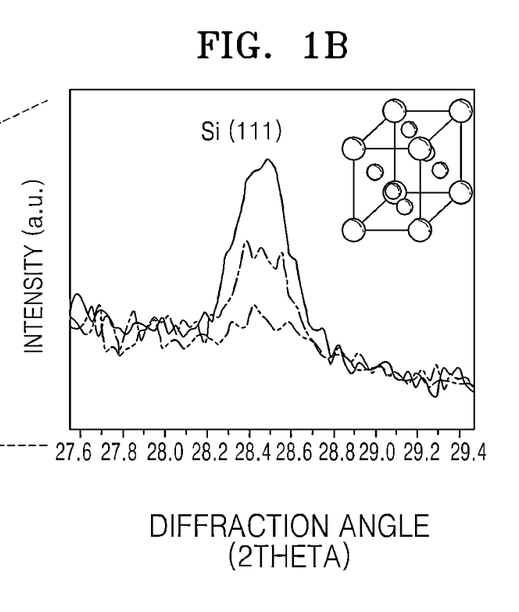
FIG. 1B is an expanded view of the portion of FIG. 1A from 27.5 to 29.5 degrees 2 theta.

Referring to the exploded view shown in FIG. 1B of the XRD pattern of FIG. 1A, an amount of silicon in each negative electrode decreases in the order of the negative electrode of Example 2 (the greatest amount), the negative electrode of Example 1 (middle), and the negative electrode of Comparative Example 1 (the smallest amount).

Evaluation Example 2: Analysis of Surface Image

Figure 2A:
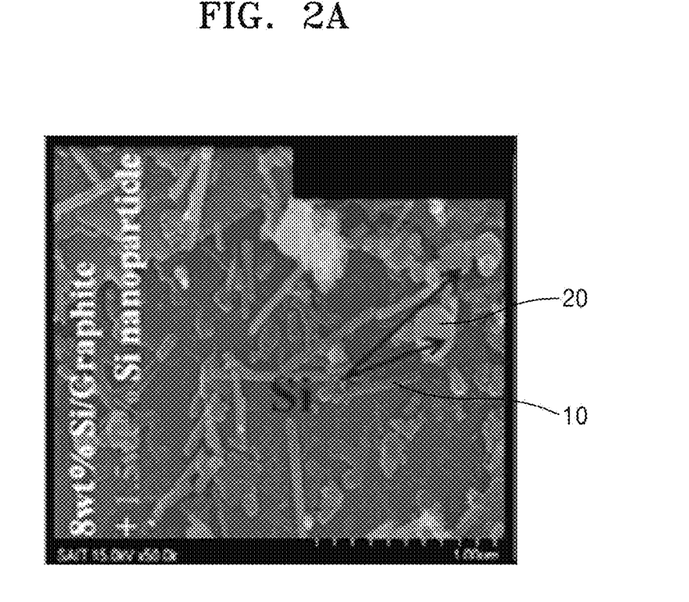
FIGS. 2A to 2C are scanning electron microscope images of the negative electrodes prepared in Examples 1 and 2, and Comparative Example 1.
Figure 2B:
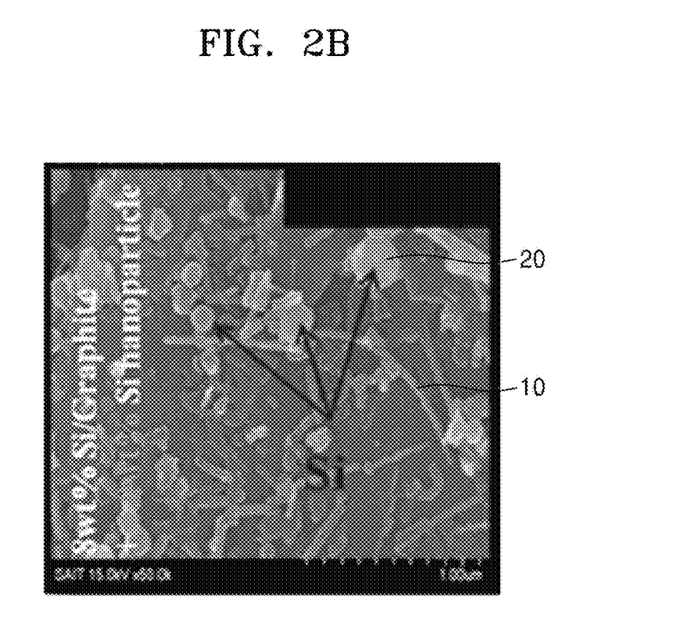
Figure 2C:
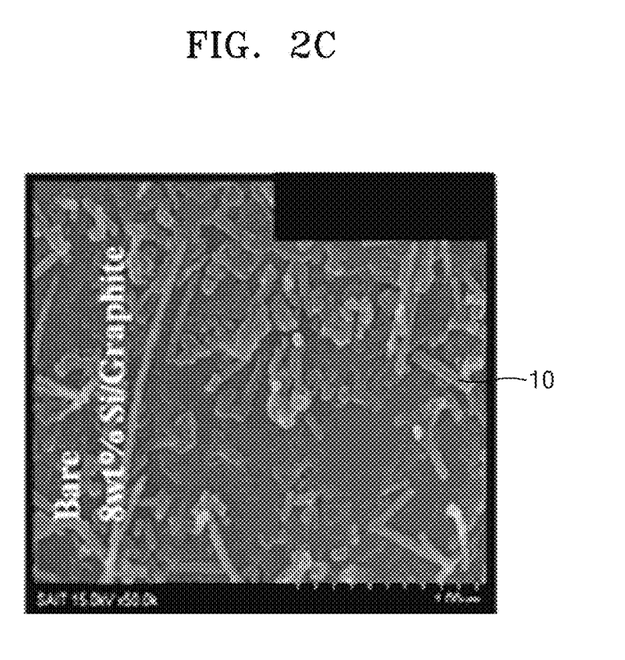

Scanning electron microscope (SEM) images of the negative electrodes prepared in Examples 1 and 2 and Comparative Example 1 are respectively shown in FIGS. 2A to 2C.

FIG. 2A is an SEM image of the negative electrode prepared in Example 1, FIG. 2B is an SEM image of the negative electrode prepared in Example 2, and FIG. 2C is an SEM image of the negative electrode prepared in Comparative Example 1.

Referring to FIGS. 2A to 2C, the negative electrodes prepared in Examples 1 and 2 not only include silicon nanowires 10, but also silicon nanoparticles 20, whereas the negative electrode prepared in Comparative Example 1 only includes silicon nanowires 10 and does not include silicon nanoparticles. Also, the negative electrode prepared in Example 2 was shown to include a greater number of the silicon nanowires than the negative electrode prepared in Example 1.

Evaluation Example 3: Evaluation of Charge and Discharge Characteristics

Charge and discharge characteristics of the coin half cells manufactured in Examples 1 and 2, Comparative Examples 1 and 2, and Reference Examples 1 to 4 were evaluated by using a charger and discharger (TOYO-3100, a product of TOYO SYSTEM Co. Ltd. of Fukushima, Japan). In greater detail, in a first cycle, each of the coin half cells was charged at a C-rate of 0.5 C (unit: mA/g) until a voltage of 0.01 V was reached. Thereafter, each of the coin half cells was rested at open circuit for 10 minutes. Subsequently, each of the coin half cells was discharged at a rate of 0.5 C until a voltage of 1.5 V was reached (for the first cycle) or 1.0 V (for second or subsequent cycles).

The charge and discharge cycle described above was repeated 100 times. The letter "C" denotes a discharge rate, which is a value obtained by dividing a total capacity of the cell by a total discharge time.

Figure 3A:
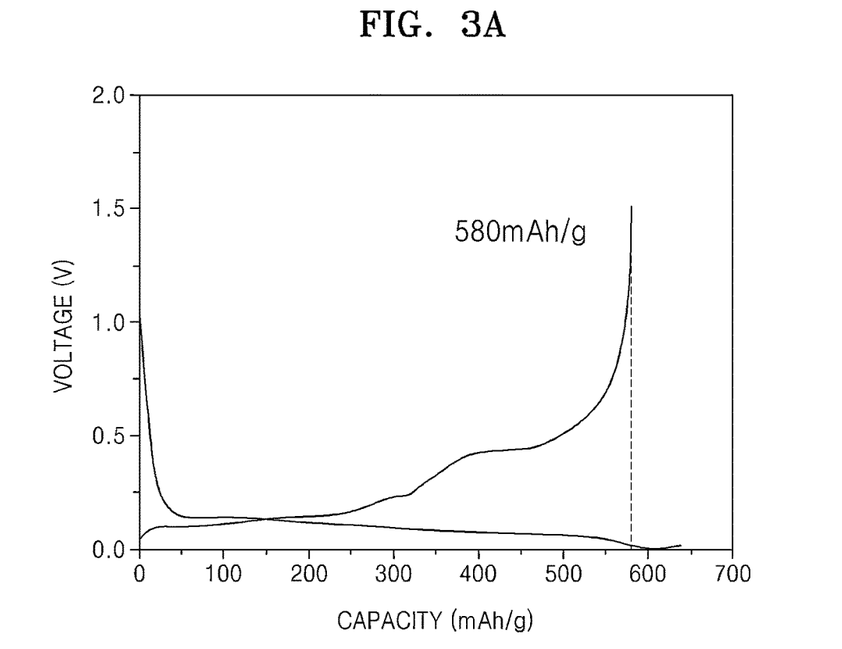
FIGS. 3A to 3D are each a graph of voltage (volts, V) versus capacity (milliampere-hours per gram, mAh/g) showing first charge and discharge of the negative electrodes prepared in Examples 1 and 2 and Comparative Examples 1 and 2.
Figure 3B:
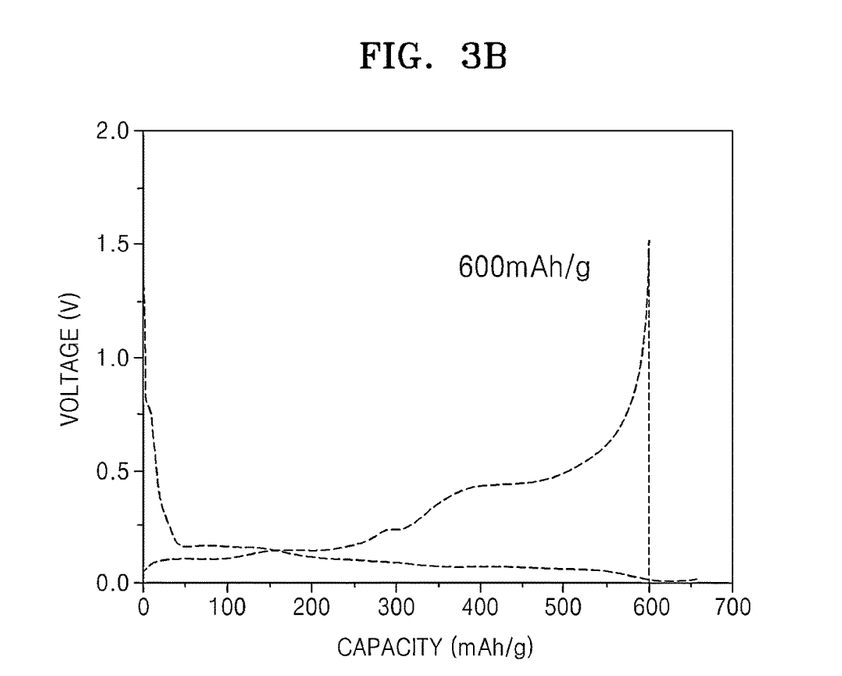
Figure 3C:
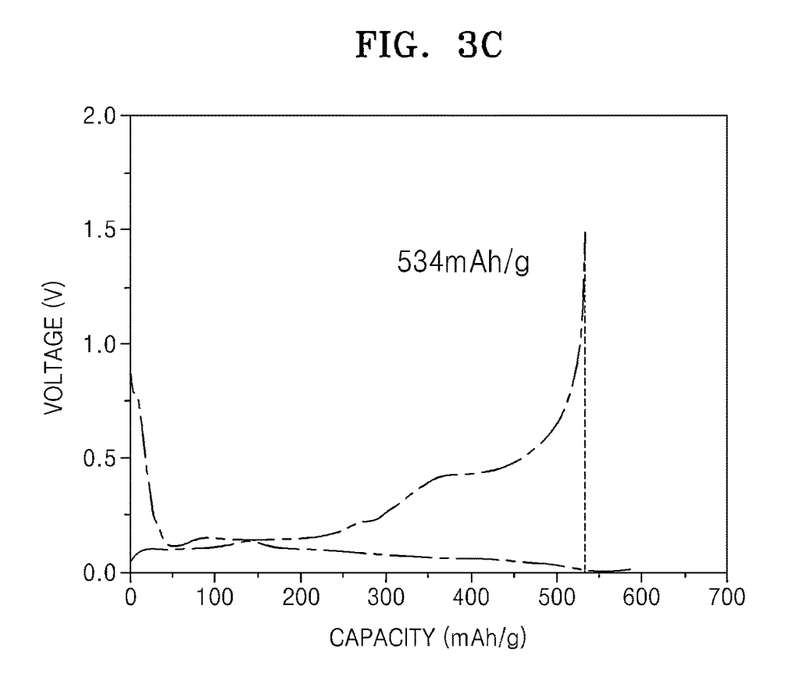
Figure 3D:
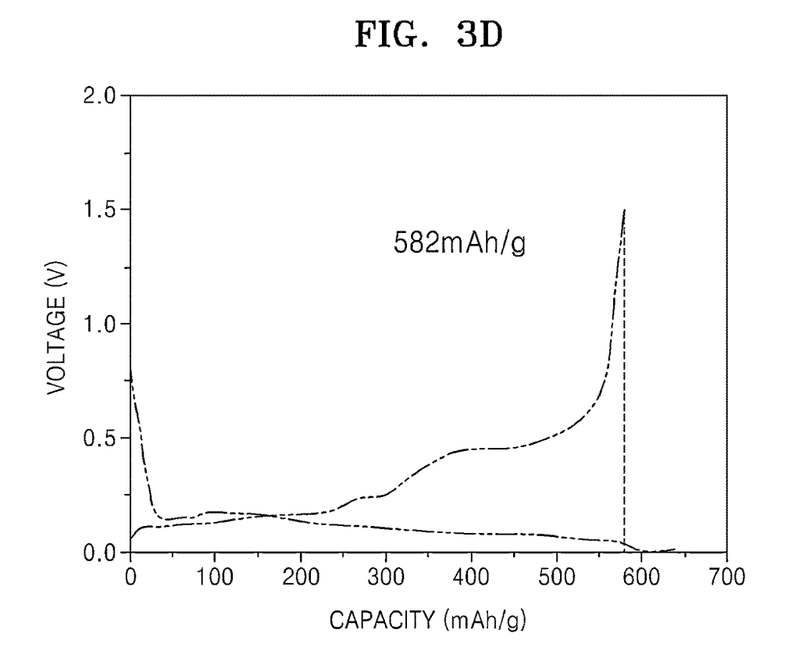

Each of evaluation results of initial charge and discharge characteristics of the coin half cells manufactured in Examples 1 and 2 and Comparative Examples 1 and 2 are respectively shown in FIGS. 3A to 3D. FIG. 3A shows evaluation results of initial charge and discharge characteristics of the coin half cell manufactured in Example 1, FIG. 3B shows evaluation results of initial charge and discharge characteristics of the coin half cell manufactured in Example 2, FIG. 3C shows evaluation results of initial charge and discharge characteristics of the coin half cell manufactured in Comparative Example 1, and FIG. 3D shows evaluation results of initial charge and discharge characteristics of the coin half cell manufactured in Comparative Example 2.

Referring to FIGS. 3A to 3D, each of the coin half cells manufactured in Examples 1 and 2 are shown to have better initial charge and discharge characteristics than the coin half cells manufactured in Comparative Examples 1 and 2, respectively.

Also, an initial discharge capacity, an initial charge and discharge efficiency, an average charge and discharge efficiency, a capacity retention rate in a 100th charge and discharge cycle, and high rate discharge characteristics of each of the coin half cells manufactured in Examples 1 and 2, Comparative Examples 1 and 2, and Reference Examples 1 to 4 were evaluated, and results obtained therefrom are shown in Table 2 below. Also, a total amount of silicon included in each of the negative electrodes prepared in Examples 1 and 2, Comparative Examples 1 and 2, and Reference Examples 1 to 4 is shown in Table 2 below.

TABLE 2

| | Total amount of silicon*[1] (wt %) | Initial discharge capacity (mAh/g) | Initial charge and discharge efficiency*[2] (%) | Average charge and discharge efficiency*[3] (%) | Capacity retention rate of $100^{th}$ cycle*[4] (%) | High rate discharge characteristics*[5] (%) |
|---|---|---|---|---|---|---|
| Example 1 | 6.65 | 580 | 90.8 | 99.7 | 91.6 | 99.7 |
| Example 2 | 7.7 | 600 | 91.3 | 99.6 | 89.8 | 98.8 |
| Comparative Example 1 | 5.6 | 534 | 90.7 | 99.7 | 92.0 | 99.8 |
| Comparative Example 2 | 7.04 | 582 | 90.9 | 99.6 | 86.3 | 96.8 |
| Reference Example 1 | 5.6 | 471 | 81.7 | 99.6 | 92.5 | 95.7 |
| Reference Example 2 | 6.65 | 504 | 83.4 | 99.8 | 90.5 | 96.7 |
| Reference Example 3 | 7.7 | 519 | 83.8 | 99.6 | 90.0 | 95.8 |
| Reference Example 4 | 11.2 | 773 | 90.1 | 99.1 | 79.0 | 96.9 |

*[1]total amount of silicon = total amount of silicon in a negative electrode
*[2]initial charge and discharge efficiency = (discharge capacity in a $1^{st}$ cycle/charge capacity in the $1^{st}$ cycle) × 100
*[3]average charge and discharge efficiency = average value of charge and discharge efficiencies of cycles 1 through 100
*[4]capacity retention rate of the $100^{th}$ cycle = ((discharge capacity when the cell is discharged at a rate of 0.5 C in the $100^{th}$ cycle)/(discharge capacity when the cell is discharged at a rate of 0.5 C in the $1^{st}$ cycle)) × 100
*[5]high rate discharge characteristics = ((discharge capacity when the cell is discharged at a rate of 0.5 C in a $1^{st}$ charge and discharge cycle)/(discharge capacity when the cell is discharged at a speed of 0.1 C in a $1^{st}$ charge and discharge cycle)) × 100

Referring to Table 2, the coin half cells manufactured in Examples 1 and 2 each have improved charge and discharge characteristics. However, the coin half cell manufactured in Comparative Example 1 was shown to have low initial discharge capacity, and the coin half cell manufactured in Comparative Example 2 was shown to have a low capacity retention rate in the $100^{th}$ cycle. Also, the coin half cells manufactured in Reference Examples 1 to 3 were shown to have low charge and discharge characteristics, except for high average charge and discharge efficiency, and the coin half cell manufactured in Reference Example 4 was shown to have a low capacity retention rate in the $100^{th}$ cycle and poor high rate discharge characteristics.

Figure 4:
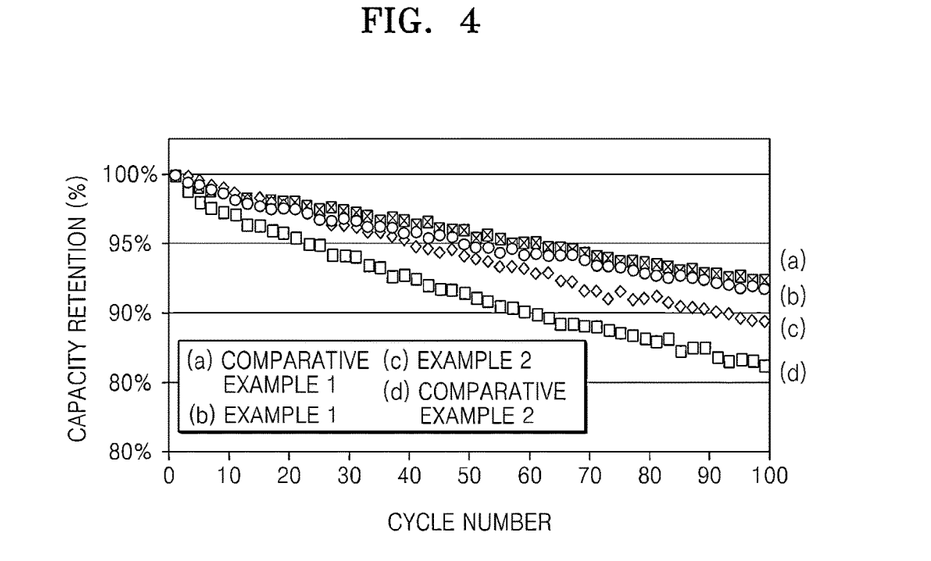
FIG. 4 is a graph of capacity retention (percent, %) versus cycle number, which shows changes in capacity retention rates according to cycle number of the coin half cells manufactured in Examples 1 and 2 and Comparative Examples 1 and 2.

Also, capacity retention rates were measured, and results thereof are shown in FIG. 4.

Referring to FIG. 4, the coin half cells manufactured in Examples 1 and 2 were shown to retain about 90% of their capacity retention, even after 100 cycles. These results show that, despite their high initial discharge capacities, the coin half cells manufactured in Examples 1 and 2 have excellent lifespan characteristics due to their structural stability.

A negative active material and a negative electrode according to an embodiment not only have high capacities, but also have other desirable charge and discharge characteristics, i.e., improved initial charge and discharge efficiency, improved average charge and discharge efficiency, improved lifespan characteristics, and improved rate discharge characteristics, which are maintained at a high level. Also, the negative active material and the negative electrode may be prepared by convenient manufacturing processes without changing processes thereof. Additional details of suitable manufacturing processes may be determined by one of skill in the art without undue experimentation, and thus further details are not provided herein for clarity.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A negative active material comprising:
   graphite;
   silicon nanowires; and
   silicon nanoparticles, wherein the negative active material comprises about 0.001 weight percent to about 37.5 weight percent of the silicon nanoparticles, based on a total weight of the negative active material,
   wherein a silicon nanowire of the silicon nanowires and a silicon nanoparticle of the silicon nanoparticles are each disposed on an outer surface of a particle of the graphite to form a composite with the graphite,
   wherein a silicon nanoparticle of the silicon nanoparticles is disposed between a particle of the graphite and a silicon nanowire of the silicon nanowires,
   wherein the negative active material comprises about 0.1 weight percent to about 50 weight percent of the silicon nanowires, based on a total weight of the negative active material, and
   wherein an amount of the silicon nanoparticles is about 1 part by weight to about 75 parts by weight, based on 100 parts by weight of the silicon nanowires.

2. The negative active material of claim 1, wherein an aspect ratio of the silicon nanowires exceeds 1.1, and an aspect ratio of the silicon nanoparticles is 1.1 or less.

3. The negative active material of claim 2, wherein an aspect ratio of the silicon nanowires is 1.11 to about 3,000, and an aspect ratio of the silicon nanoparticles is 0.91 to 1.1.

4. The negative active material of claim 1, wherein an amount of the graphite is about 12.5 weight percent to about 99.899 weight percent, based on a total weight of the negative active material.

5. The negative active material of claim 1, wherein the negative active material has an initial discharge capacity of at least 580 milliampere-hours per gram and a capacity retention of at least 89 percent.

6. A negative electrode comprising the negative active material according to claim 1.

7. A lithium secondary battery comprising the negative electrode according to claim 6.

8. A negative active material comprising a composite, the composite comprising:
   about 12.5 weight percent to about 99.899 weight percent graphite;
   about 0.1 weight percent to about 10 weight percent of silicon nanowires, wherein an aspect ratio of the silicon nanowires is 1.11 to about 3,000; and
   about 0.1 weight percent to about 10 weight percent of silicon nanoparticles, wherein an aspect ratio of the silicon nanoparticles is 0.91 to 1.1,
   wherein a silicon nanoparticle of the silicon nanoparticles is disposed between a particle of the graphite and a silicon nanowire of the silicon nanowires, and
   wherein a silicon nanowire of the silicon nanowires and a silicon nanoparticle of the silicon nanoparticles are each disposed on an outer surface of a particle of the graphite.

9. A method of manufacturing a negative active material, the method comprising:
   contacting graphite, silicon nanowires, silicon nanoparticles, and a solvent to form a slurry; and
   drying the slurry,
   wherein the negative active material comprises
   graphite;
   silicon nanowires; and
   silicon nanoparticles, wherein the negative active material comprises about 0.001 weight percent to about 37.5 weight percent of the silicon nanoparticles based on a total weight of the negative active material,
   wherein a silicon nanowire of the silicon nanowires and a silicon nanoparticle of the silicon nanoparticles are each disposed on an outer surface of a particle of the graphite to form a composite with the graphite,
   wherein a silicon nanoparticle of the silicon nanoparticles is disposed between a particle of the graphite and a silicon nanowire of the silicon nanowires
   wherein the negative active material comprises about 0.1 weight percent to about 50 weight percent of the silicon nanowires, based on a total weight of the negative active material, and
   wherein an amount of the silicon nanoparticles is about 1 part by weight to about 75 parts by weight, based on 100 parts by weight of the silicon nanowires.

* * * * *